(12) United States Patent
Shiratori

(10) Patent No.: US 6,345,016 B1
(45) Date of Patent: Feb. 5, 2002

(54) SIGNAL-REPRODUCING METHOD AND APPARATUS UTILIZING LIGHT BEAM GENERATED TEMPERATURE DISTRIBUTION AND MAGNETIC DOMAIN WALL DISPLACEMENT

(75) Inventor: Tsutomu Shiratori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/144,473

(22) Filed: Aug. 31, 1998

(30) Foreign Application Priority Data

Sep. 1, 1997 (JP) .............................................. 9-235885

(51) Int. Cl.$^7$ ............................................. G11B 11/00
(52) U.S. Cl. .................................. 369/13.54; 369/13.52
(58) Field of Search ................................ 369/13, 13.54, 369/13.52

(56) References Cited

U.S. PATENT DOCUMENTS

| | | | | |
|---|---|---|---|---|
| 5,783,300 A | * | 7/1998 | Osato et al. ............... | 369/13 X |
| 5,936,915 A | * | 8/1999 | Fujii et al. .................... | 369/13 |
| 5,953,289 A | * | 9/1999 | Miyaaoka .................... | 369/13 |
| 5,991,242 A | * | 11/1999 | Ishii .......................... | 369/13 X |
| 5,995,472 A | * | 11/1999 | Fujii et al. ................. | 369/13 X |
| 6,104,676 A | * | 8/2000 | Yamamoto .................... | 369/13 |

FOREIGN PATENT DOCUMENTS

| | | |
|---|---|---|
| EP | 0 618 572 | 10/1994 |
| EP | 0 785 545 | 7/1997 |
| EP | 0 831 465 | 3/1998 |
| JP | 3-93058 | 4/1991 |
| JP | 04-188403 | 7/1992 |
| JP | 6-290496 | 10/1994 |
| JP | 08-293135 | 5/1996 |
| JP | 08-287537 | 11/1996 |

* cited by examiner

Primary Examiner—Aristotelis M. Psitos
(74) Attorney, Agent, or Firm—Fitzpatrick, Cella, Harper & Scinto

(57) ABSTRACT

A signal reproducing method for reproducing information by domain wall displacement on a recording medium having recorded information comprises steps of projecting a light spot onto the recording medium to cause temperature distribution thereon, moving relatively the light spot and the recording medium, applying a reproducing magnetic field to the light spot area on the recording medium to prevent displacement of the domain wall from the rear portion of the moving light spot into the inside thereof, and detecting the domain wall displacement to reproduce the information. The temperature gradient may satisfy the relation below:

$$|G1|>|G2|$$

where G1 is the temperature gradient in the front portion in the moving direction, and G2 is the temperature gradient in the rear portion in the moving direction. The recording medium has a first magnetic layer enabling displacement of the domain wall, a third magnetic layer for memorizing information, and a second magnetic layer provided between the first magnetic layer and the third magnetic layer, and having a Curie temperature lower than the Curie temperature temperatures of the first magnetic layer and the third magnetic layer.

7 Claims, 11 Drawing Sheets

FIG. 2C PRIOR ART +H −H

LASER BEAM

Pr = 0.8 mW

Pr = 1.5 mW

Pr = 1.5 mW
Hr = 200 Oe

Hr = 0 Oe

Hr = 200 Oe

SIGNAL-REPRODUCING METHOD AND APPARATUS UTILIZING LIGHT BEAM GENERATED TEMPERATURE DISTRIBUTION AND MAGNETIC DOMAIN WALL DISPLACEMENT

BACKGROUND OF THE INVENTION

1. Field of the Invention

The present invention relates to a method for reproducing signals recorded by magnetic orientation states in a magnetic material of a magnetic recording medium and an apparatus therefor.

2. Related Background Art

Magnetic recording mediums on which information is recorded by magnetic orientation states in a magnetic material such as magnetic recording mediums and magneto-optical mediums are attracting attention as rewritable high-density recording mediums. In recent years, still higher recording density of the magnetic recording medium is demanded for larger capacity of the recording medium.

In a magneto-optical recording system employing a magneto-optical medium and a recording-reproducing apparatus therefor, information is recorded by forming magnetic domains on a magnetic thin film by thermal energy of a semiconductor laser, and the recorded information is read out by utilizing magneto-optical effect. Generally, the linear recording density of an optical recording medium depends greatly on the laser wavelength of the reproducing optical system, and the numerical aperture NA of the objective lens. Specifically, the laser wavelength $\lambda$ and the numerical aperture NA of the objective lens of the reproducing optical system decide the diameter of the beam waist, whereby the detectable range of the spatial frequency of the recording pits is limited to about $2NA/\lambda$.

For achieving higher recording density with a conventional optical disk, the laser wavelength should be shorter, or the NA of the objective lens should be larger in the reproducing optical system. However, the laser wavelength $\lambda$ cannot readily be shortened owing to the efficiency limit and heat generation of the laser element, and the increase of the numerical aperture NA of the objective lens results in smaller focal depth, requiring higher mechanical accuracy, disadvantageously.

To solve the above problems, super-resolution techniques are being developed to improve recording density by changing the constitution of the recording medium and changing the reproducing method without changing the laser wavelength and the numerical aperture of the objective lens.

Japanese Patent Application Laid-Open No. 3-93058 discloses a signal-reproducing method. In this method, a multilayered film having a displacement layer and a memory layer coupled magnetically is provided, signals are recorded on the memory layer, the magnetization orientation in the displacement layer is made uniform, a laser light beam is projected thereto for heating, and the signals recorded on the memory layer is transferred to the heated region of the displacement layer for reading the recorded signals.

In this method, the size of the region heated by the laser up to the signal transfer temperature for signal detection can be made smaller than the laser spot diameter, whereby interference between the signs can be decreased to enable reproduction of signals of a cycle less than optical diffraction limit.

In any of the known super-resolution systems, the reproducing light is partly intercepted with a mask to limit the pit-reading aperture to a smaller region to improve the resolution limit. Thereby, the light intercepted by the mask is not utilized, and the amplitude of the reproduced signal is decreased, disadvantageously. In other words, the portion of the light intercepted by the mask does not contribute to the signal reproduction. Therefore, the smaller the aperture for higher resolution, the less is the effective light, and the lower is the signal level.

To solve the above problems, the inventors of the present invention disclosed a method for reproducing high-density recorded signal in Japanese Patent Application Laid-Open No. 6-290496 in which a special magnetic recording medium is employed, a magnetic domain wall existing at the border of the recorded mark is displaced by temperature gradient to the higher temperature side, and the domain wall displacement is detected to reproduce the high-density recorded signal.

In this method, however, since the temperature gradient is formed by heating the recording medium with the reproducing light beam itself, the peak of the temperature distribution is formed inside the reproducing light spot, and the displacement of the domain wall from the front side of the displacement of the region of the domain wall displacement and that from the rear side thereof are both read by the reproduction spot, not giving satisfactory signal reproduction. Therefore a separate means for controlling the temperature distribution is required in addition to the reproducing light beam, which complicates the reproduction apparatus.

FIG. 1 shows a constitution of a conventional system. In FIG. 1, magneto-optical disk 101 is constituted of substrate 102, magneto-optical medium 103 formed thereon, and protection layer 104 formed further thereon. Substrate 102 is formed from glass or a plastic material. Magneto-optical medium 103 is comprised of a multiple layer comprising at least a memory layer and a displacement layer, and is capable of reproducing record marks of less than optical diffraction limit of the optical system by displacing a domain wall by utilizing temperature gradient caused by light beam irradiation without changing recorded data in the memory layer, magnetizing uniformly and almost entirely the reproducing light beam-spotted region on the displacement layer, and detecting the change of polarization direction of the reflected light beam. Magneto-optical disk 101 is set to a spindle motor by a magnet chucking or a like means to be rotatable on a rotation axis.

Parts 105 to 117 constitute an optical head for projecting a laser beam to magneto-optical disk 101 and for receiving information from reflected light. The parts comprise condenser lens 106 as an objective lens, actuator 105 for driving condenser lens 106, semiconductor laser 107 of a wavelength of 680 nm for record reproduction, semiconductor laser 108 of wavelength of 1.3 $\mu$m for heating, collimator lenses 109,110, dichroic mirror 111 for completely transmitting light of 680 nm and completely reflecting light of 1.3 $\mu$m, beam splitter 112, dichroic mirror 113 for intercepting light of 1.3 $\mu$m and completely transmitting light of 680 nm to prevent leakage of light of 1.3 $\mu$m into the signal detecting system, $\lambda/2$ plate 114, polarized light beam splitter 115, photosensors 117, condenser lenses 116 for photosensor, differential amplification circuit 118 for differentially amplifying the condensed and detected signals for respective polarization direction, LD driver 119, and controller 120 for recording power control.

The laser beams of 680 nm and 1.3 $\mu$m emitted respectively from semiconductor lasers 107,108 for recording-reproducing and heating are introduced through collimator lenses 109,110, dichroic mirror 111, beam splitter 112, and condenser lens 106 to magneto-optical disk 101. Condenser lens 106 moves in the focusing direction and the tracking direction under control by actuator 105 to focus the laser beams successively on magneto-optical medium 103 by tracking along a guiding groove formed on magneto-optical disk 101. The light flux of 1.3 μm is made smaller than the aperture diameter of condenser lens 106 to make the NA smaller than that of the light of 680 nm which is condensed through the entire area of the aperture.

The heating spot, which is formed with a larger wavelength and a smaller NA, has a larger diameter of heating beam than the recording-reproducing spot of recording-reproducing beam as shown in FIGS. 3A and 3B. Thereby, a desired temperature gradient is produced in the recording-reproducing spot region on the moving medium face as shown in FIG. 3D. The laser beam reflected by magneto-optical disk 101 is deflected by beam splitter 112 to the optical path toward polarized light beam splitter 115, and travels through dichroic mirror 113, λ/2 plate 114, and polarized light beam splitter 115. The split light beams are respectively condensed by lenses 116 onto sensors 117 corresponding to magnetization polarity of the spot on magneto-optical layer. The condensed light beams are composed only of 680 nm light since dichroic mirror 113 intercepts the 1.3 μm light. The outputs from the respective photosensors 117 are amplified differentially by differential amplifier 118 to output the magneto-optical signals. Controller 120 receives information on rotation rate of magneto-optical disk 101, recording radius, recording sectors, and so forth and outputs recording power, and recording signals to control LD driver (laser diode driver) 119, and magnetic head driver 124. LD driver 119 drives semiconductor lasers 107,108. In this example, LD driver 119 supplies a recording power and a reproducing power to semiconductor laser 107, and supplies a heating beam power to semiconductor laser 108.

Magnetic head 123 applies a modulation magnetic field onto the laser irradiation spot on magneto-optical disk 101 for the recording operation. Magnetic head 123 is placed in opposition to condenser lens 106 with interposition of magneto-optical disk 101. During recording, recording-reproducing semiconductor laser 107 applies recording laser power by DC light irradiation under control by LD driver 119, and synchronously magnetic head 123 produces magnetic fields of different polarities under control by magnetic head driver 124 in correspondence with the recording signals. Magnetic head 123 moves with the optical head in a radius direction of magneto-optical disk 101, and applies a magnetic field successively on recording onto the laser irradiation site of magneto-optical medium 103. The magneto-optical medium 103 is constituted of three layers, as shown in FIG. 3C, comprising a memory layer, a switching layer, and a displacement layer, and have respectively a magnetic domain wall structure as shown by the arrow marks.

The recording-reproducing operation is explained by reference to FIGS. 2A to 2F. FIG. 2A shows recording signals, FIG. 2B a recording power, FIG. 2C modulating magnetic fields, FIG. 2D record marks, FIG. 2E reproducing signals, and FIG. 2F binary signals. In recording of the recording signals as shown in FIG. 2A, the power of semiconductor laser 107 is controlled to be at a prescribed level during the recording operation, and modulating magnetic field is applied in accordance with the recording signals. Thereby, record mark sequence is formed in the process of cooling of the magneto-optical medium, as shown in FIG. 2D, where the line-shadowed portions are magnetic domains magnetized in the direction corresponding to the record marks in the present invention, and the white blank portions are magnetic domains magnetized in the reverse direction thereto.

The reproduction operation is explained below by reference to FIGS. 3A to 3D. The displacement layer 76 is heated by a heating beam 74 up to a temperature for causing the displacement of the domain wall in the displacement layer of the medium. The isothermal line 75 of the temperature Ts of the recording medium, which is the main factor for inducing displacement of the domain wall, crosses the beam movement direction 71 both in the front portion and in the rear portion of the beam spot. The domain walls can displace backward from the front side and forward from the back side of the beam movement direction as shown by numeral 72 in FIG. 3A. Therefore, the magnetic domain wall displacement signals from the front side only can be detected by placing record-reproducing beam 73 only at the front side of the beam-moving direction as shown in FIG. 3A. Similarly, the magnetic domain wall displacement signals from the back side only can be detected by placing record-reproducing beam 73 at the back side of the beam-moving direction as shown in FIG. 3B. In FIG. 3C, numeral 77 denotes a switching layer, and 78 a memory layer.

In either case, the record mark sequence as shown in FIG. 2D is reproduced by the record-reproducing beam to obtain reproduced signals (FIG. 2E), and further to obtain binary signals (FIG. 2F). In the above magneto-optical recording-reproducing method, a light beam is projected to cause displacement of the domain walls of the record marks in the displacement layer by utilizing temperature gradient caused by the light beam without change of the recorded data in the memory layer, and the change of the polarization direction of the reflected light beam is detected to reproduce the record marks. According to this magneto-optical recording-reproducing method, the magnetization states carried by the reproducing beam are all equal as shown in FIGS. 3A and 3B. Therefore, the reproduced signals are rectangular, and record marks of less than diffraction limit of the optical system can be reproduced without decreasing the reproducing signal amplitude. Thereby, a medium and a method for magneto-optical recording can be provided which have been improved in recording density and transfer rate.

SUMMARY OF THE INVENTION

An object of the present invention is to solve the aforementioned problems of the disclosed method of reproduction of high-density record signals.

Another object of the present invention is to provide an improved method of reproduction of information signals of a domain wall displacement detection type, in which high-density record signals are obtained by heating the magneto-optical medium with the reproducing light beam itself without complicating the reproduction apparatus.

A further object of the present invention is to provide an apparatus for reproducing the information signals of a domain wall displacement detection type recorded on a recording medium.

The signal reproducing method of the present invention for reproducing information by domain wall displacement on a recording medium having recorded information comprises steps of projecting a light spot onto the recording medium to cause temperature distribution thereon; moving relatively the light spot and the recording medium; applying a reproducing magnetic field to the light spot area on the recording medium to prevent displacement of the domain wall from the rear portion of the moving light spot into the inside thereof, and detecting the domain wall displacement to reproduce the information.

The signal reproducing apparatus of the present invention for reproducing information by domain wall displacement on a recording medium having recorded information comprises a means for projecting a light spot onto the recording medium to cause temperature distribution thereon; a means for moving relatively the light spot and the recording medium; a means for applying a reproducing magnetic field to the light spot area on the recording medium to prevent displacement of the domain wall from the rear portion of the moving light spot into the inside thereof, and a means for detecting the domain wall displacement to reproduce the information.

BRIEF DESCRIPTION OF THE DRAWINGS

FIGS. 2A, 2B, 2C, 2D, 2E, and 2F are drawings for explaining operation of record reproduction with the apparatus shown in FIG. 1.

In FIG. 5B, the sign "+" shows the direction of the force toward the left side, and the sign "−" shows the direction of the force toward the right side of the drawing.

DESCRIPTION OF THE PREFERRED EMBODIMENTS

Figure 1:
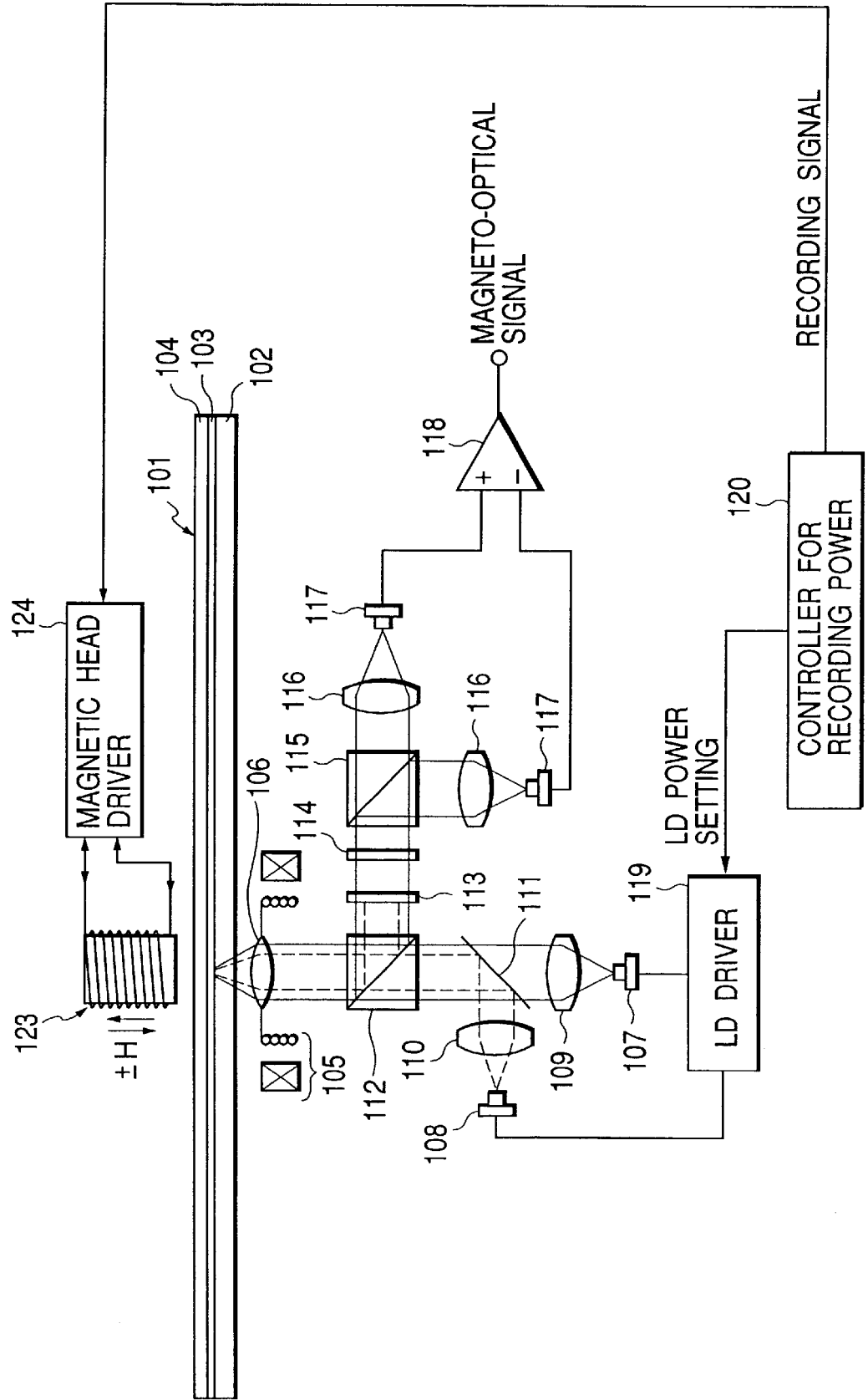
FIG. 1 illustrates a constitution of a magneto-optical recording apparatus.
Figures 2A, 2B, 2D, 2E, 2F:
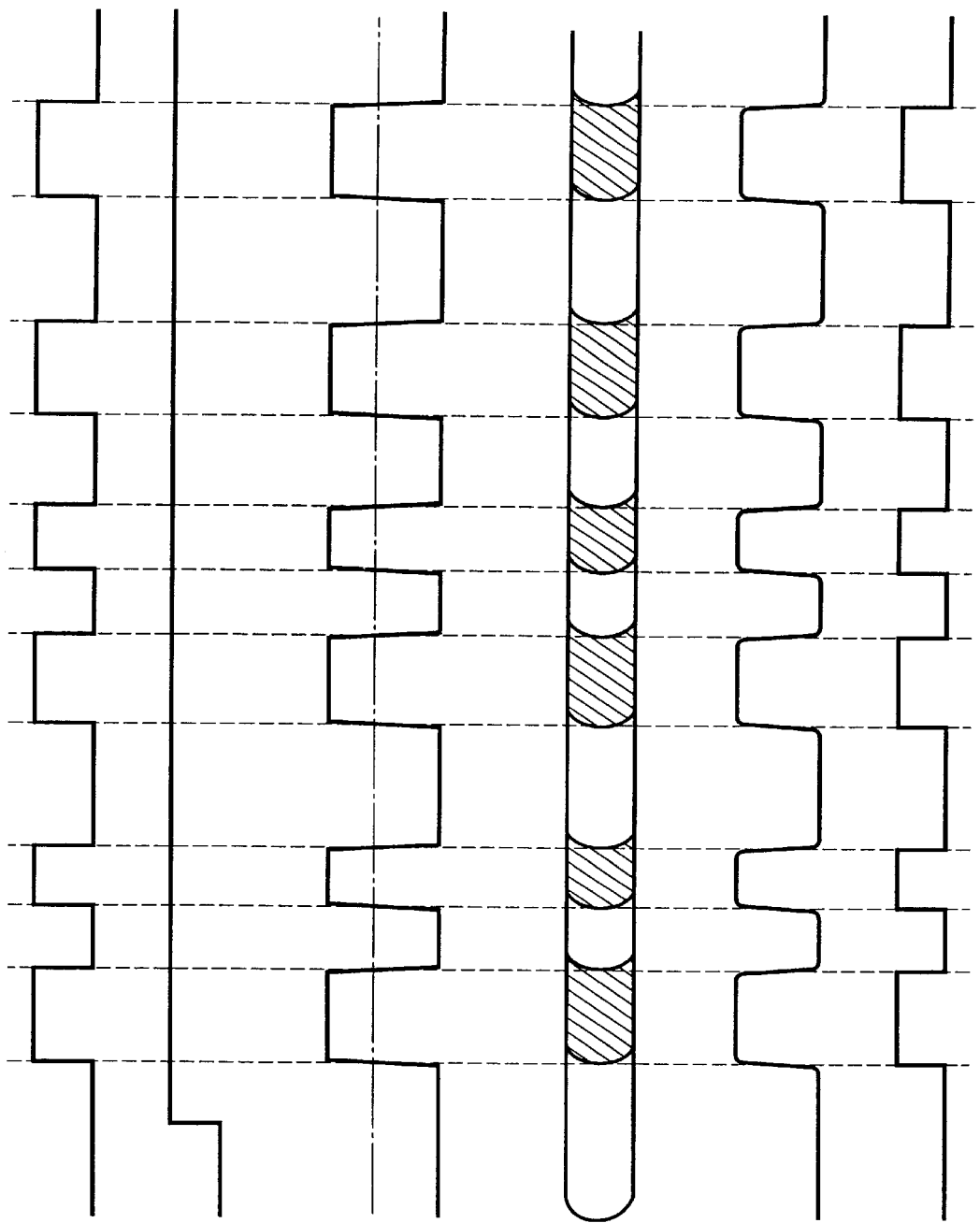
Figures 3A, 3B, 3C, 3D:
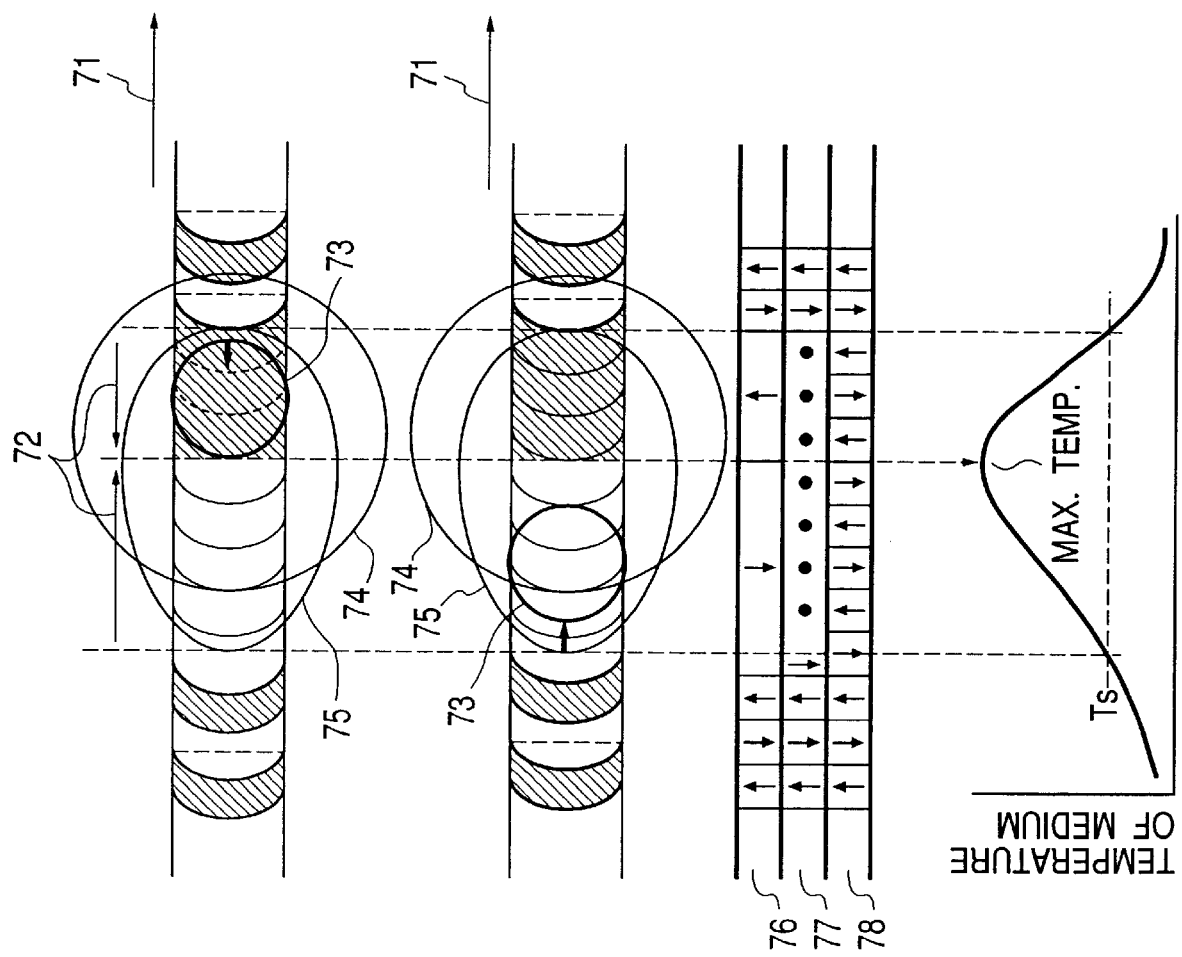
FIGS. 3A, 3B, 3C, and 3D are drawings for explaining conventional operation of record reproduction.
Figure 4A:
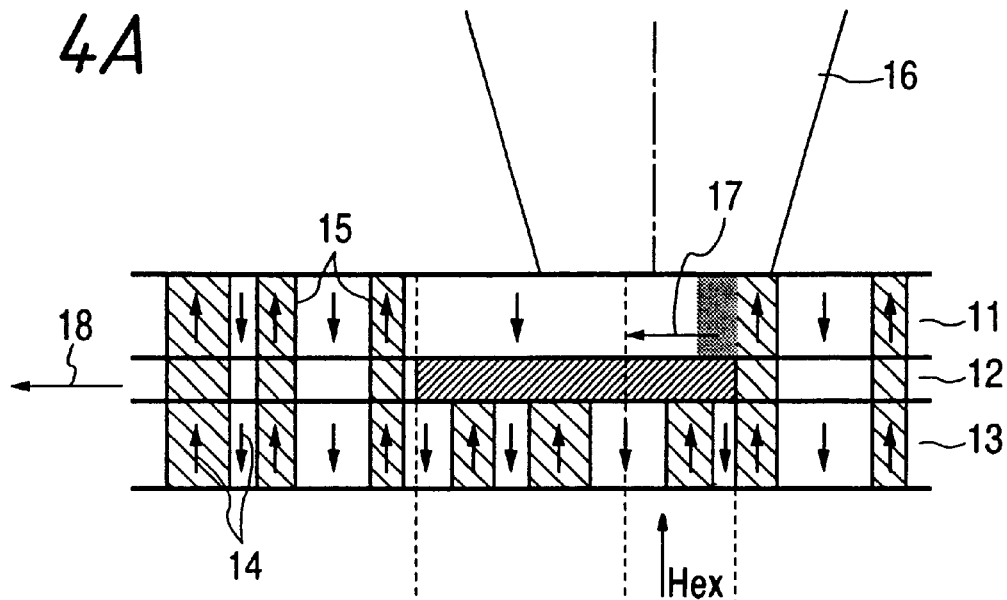
FIGS. 4A and 4B illustrate schematically a process for information reproduction of the present invention.
Figure 4B:
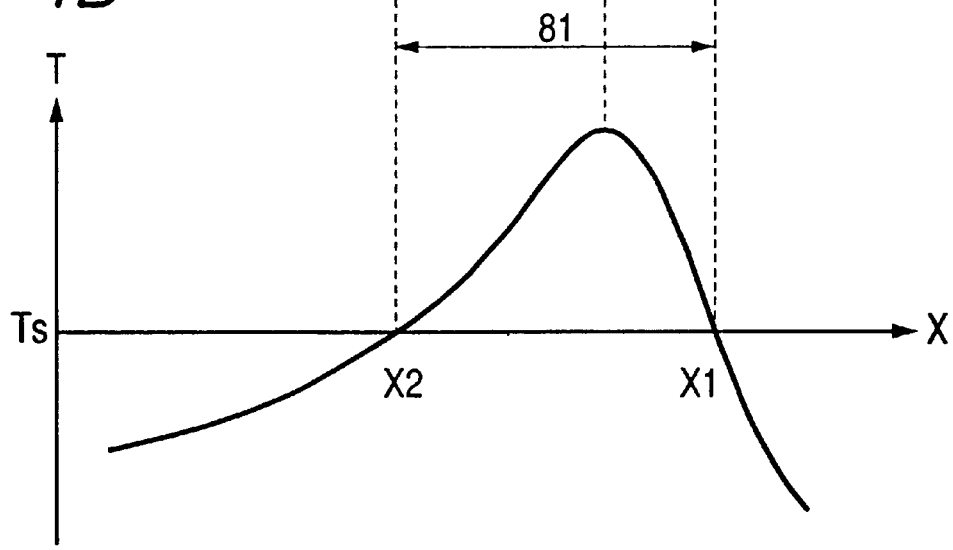

FIGS. 4A and 4B illustrate schematically the operation of the reproduction in the present invention. This reproduction process can be practiced with the apparatus shown in FIG. 1. The reproducing magnetic field mentioned later can be generated by DC drive of magnetic head 123.

FIG. 4A is a schematic sectional view of a magneto-optical medium employed in reproduction of the present invention. The magnetic layer of this medium is constituted of first magnetic layer 11, second magnetic layer 12, and third magnetic layer 13 laminated successively. The vertical arrow marks 14 for the respective layer show the directions of the atom spin. Arrow mark 17 shows the direction of domain wall displacement. Arrow mark 18 shows the direction of medium movement. Domain walls 15 are formed at the borders between the regions of reverse spin directions. The numeral 16 indicates light beam for heating-and-reproducing.

FIG. 4B shows temperature distribution formed on the magneto-optical medium moving relatively to the light beam. This temperature distribution is caused on the medium by the light beam itself projected for information reproduction. At the positions X1 and X2 which are fixed relative to the light beam, the temperature of the medium reaches the Curie temperature Ts of the second magnetic layer. In the region 81 between position X1 and position X2 the exchange coupling between the first magnetic layer and the third magnetic layer is eliminated. This region is called a decoupling region.

At the time when a domain wall existing in the first magnetic layer has been brought to the decoupling region, the domain wall in the first magnetic layer displaces toward the temperature peak on the medium. The principle of this displacement is explained below.

Figure 5A:
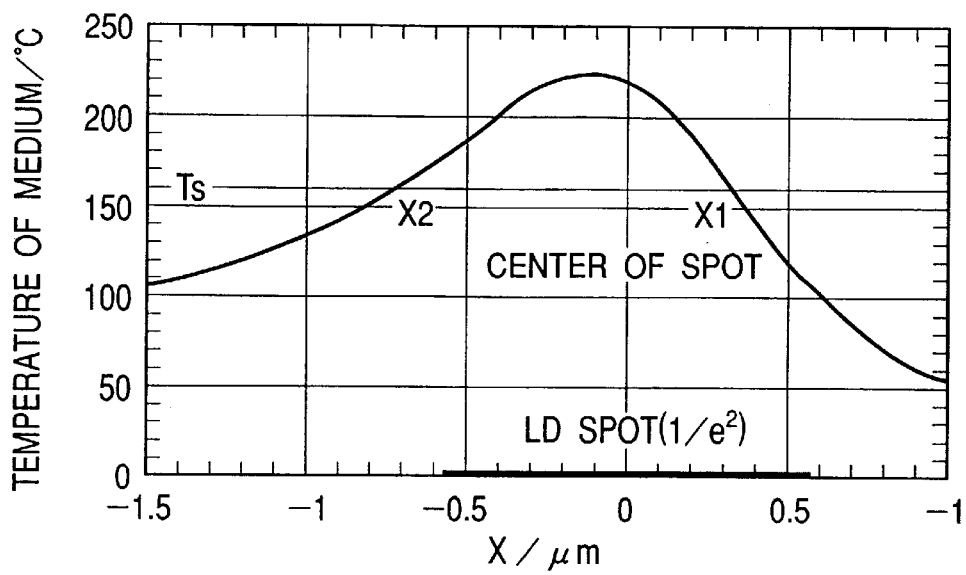
FIG. 5A shows an example of temperature distribution in X direction formed on the magneto-optical medium of the present invention.
Figure 5B:
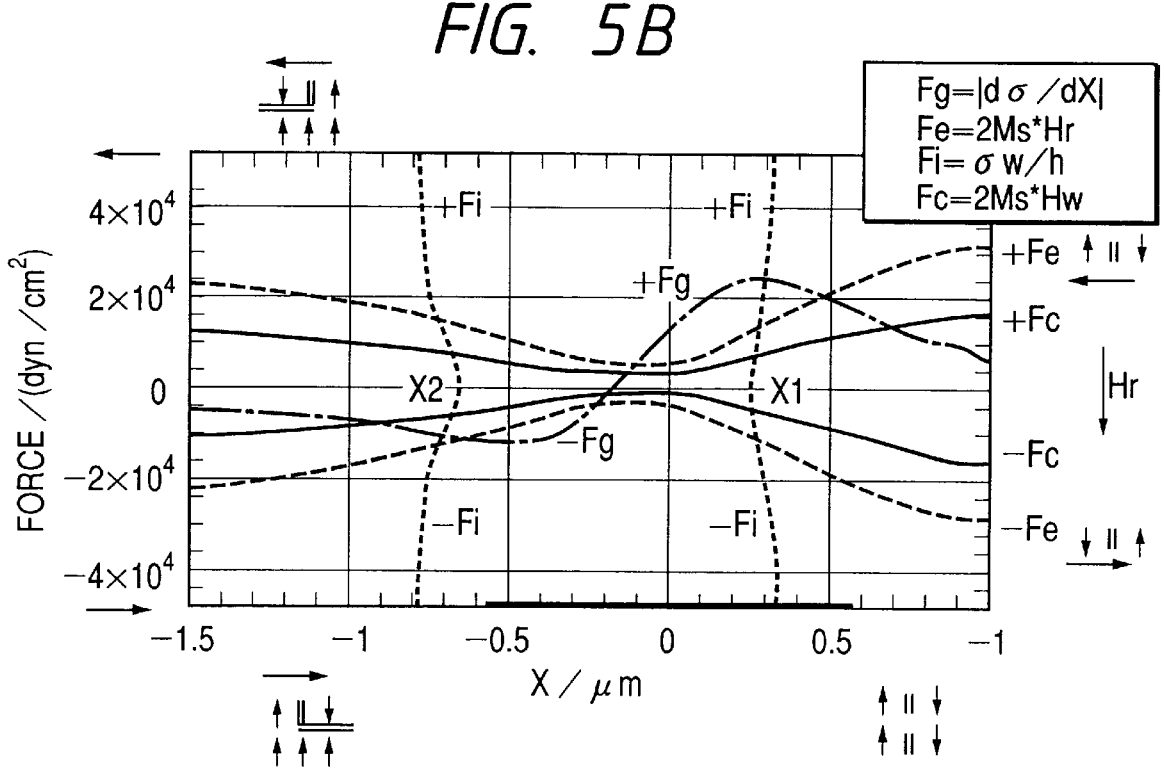
FIG. 5B shows force applied to a domain wall at position X in a first magnetic layer in the temperature distribution formed on the medium as shown in FIG. 5A.

FIG. 5B shows the force applied to the domain wall in the first magnetic layer at position X, when the temperature distribution is formed on the medium as shown in FIG. 5A. In FIG. 5B, the sign "+" shows the direction of the force toward the left side, and the sign "−" shows the direction of the force toward the right side of the drawing.

In the first magnetic layer, the domain wall energy density a is distributed (not shown in the drawing) in correspondence with the temperature distribution. The gradient of the domain wall energy density σ in X direction exerts force Fg represented by the equation below to the domain wall of the first magnetic layer at position X (FIG. 5B).

$$Fg=|d\sigma/dX|=|d\sigma/dT|\times|dT/dX| \quad (1)$$

wherein T denotes temperature. This force drives the domain wall toward the portion of a lower domain wall energy level.

Additionally, the domain wall receives force Fe (FIG. 5B) from the outside magnetic field, and force Fi (FIG. 5B) of the first magnetic layer caused by exchange interaction with the third magnetic layer.

Force Fe is given by Equation (2):

$$Fe=2Ms\times Hr \quad (2)$$

where Ms is saturation magnetization of the first magnetic layer at temperature T, and Hr is the intensity of the external magnetic field in easy magnetization axis direction. This force drives the domain wall to the direction to expand the region of magnetic orientation direction stable to the external magnetic field.

Force Fi is given by Equation (3):

$$Fi=\sigma w/h \quad (3)$$

where σw is the interfacial wall energy density between the first magnetic layer and the third magnetic layer, and h is the thickness of the first magnetic layer. This force displaces the domain wall to the direction to allow the interfacial wall disappear between the first magnetic layer and the third magnetic layer. When no interfacial wall exists between the first magnetic layer and the third magnetic layer, and the domain wall of the first magnetic layer and the domain wall of the third magnetic layer are formed at the same position, this force prevents the displacement of the domain wall.

Further, force Fc (FIG. 5B) given by Equation (4) below prevents the displacement of the domain wall incessantly.

$$Fc=2Ms\times Hw \quad (4)$$

where Ms is the saturation magnetization of the first magnetic layer, and Hw is wall coercivity of the domain wall.

Additionally, a demagnetization field, a floating magnetic field, and the domain wall at the lateral side of the recorded domain can affect the displacement of the domain wall. When the recorded domain is enclosed in a closed domain wall, the behavior of the domain wall is affected by the displacement direction because if the direction is that to expand the domain, additional domain wall is generated; on the other hand, if the direction is that to shrink the domain, a part of domain wall is disappeared.

However, the effect of the demagnetization field and the floating magnetic field can be reduced by decreasing the saturation magnetization. The influence of the generation/disappearance of magnetic domain wall can be avoided by forming independently the domain walls at the front portion and the rear of portion of the record mark. For example, recording marks are to be formed with the full width of the recording track by use of a medium in which the coupling by exchange interaction in film face direction is broken or decreased at the both sides of the recording track.

In this disclosure, the influences of the demagnetization field and the floating magnetic field, and the influence of the domain wall formed at the lateral portion of the recording mark are not considered assuming that the medium is prepared as above to decrease the effect to negligible levels.

Now, consideration is made on application of an external magnetic field in a downward direction perpendicular to the film face, assuming that the magnetization of the first magnetic layer is developed in the same direction as the noticed atomic spin. For simplicity of the discussion, fine domain magnetized upward is isolatedly formed in a region magnetized downward.

FIGS. 6A to 6D and FIGS. 7A to 7D show the force applied to the front domain wall and the rear domain wall of a magnetic domain and the displacement of the domain wall when the medium is moved from right to left of the drawing relatively to the heating region to drive the isolated magnetic domain to pass through the decoupling region.

Figure 6A:
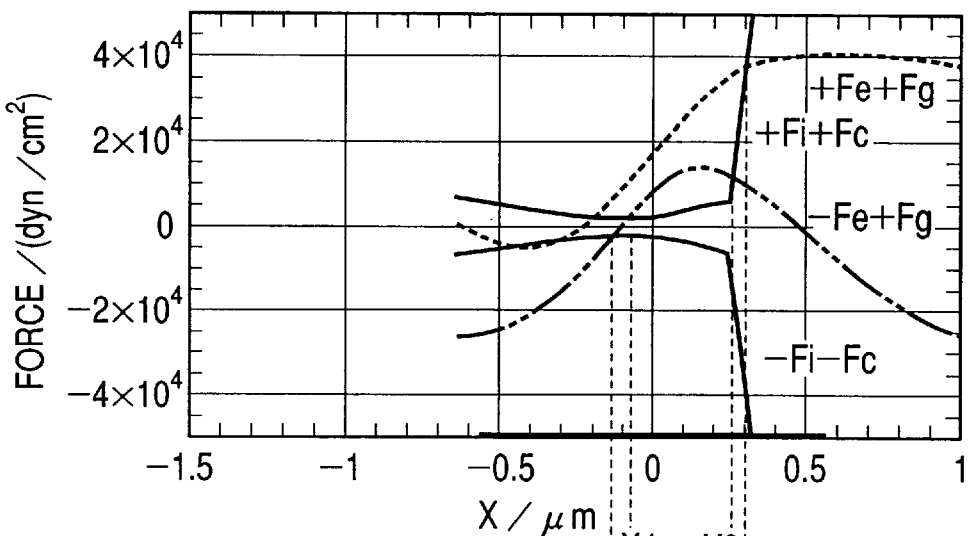
FIGS. 6A, 6B, 6C, and 6D show the displacement of the domain wall from the front direction of the heated region.

FIG. 6A shows the force applied to the domain wall of the first magnetic layer in the front portion of the heating region.

In the region apart sufficiently rightward from the decoupling region, the force Fi is dominantly applied to the first magnetic layer by exchange interaction with the third magnetic layer. There, the domain wall in the first magnetic layer is fixed at the same position as the domain wall of the third magnetic layer, and no interfacial domain wall exists. Force Fi serves to prevent displacement of the domain wall in the medium.

At the left side of front domain wall 31 (FIG. 6B), the magnetic orientation of the first magnetic layer is directed downward, while at the right side thereof the magnetic orientation is directed upward. To this domain wall, force −Fe is applied by the external magnetic field to drive the domain wall to the right side.

Figure 6B:
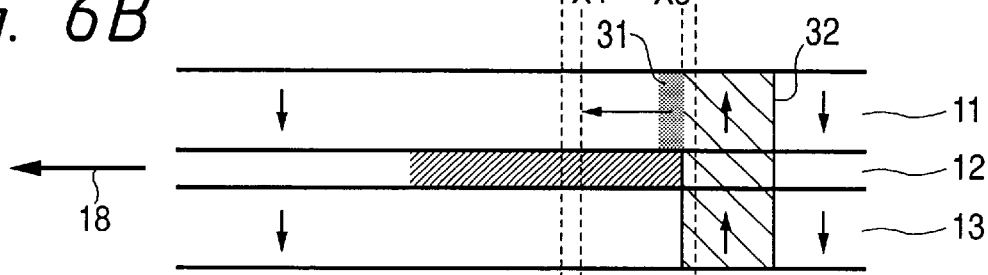
Figure 6C:
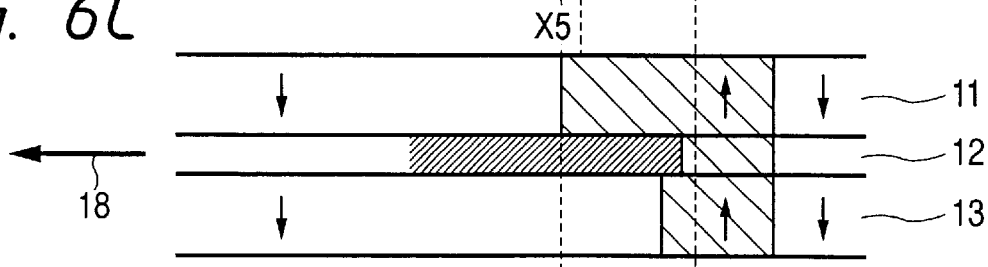

When this domain wall has been brought close to the decoupling region from the right side of the heating region, force +Fg is applied to the domain wall to drive the domain wall to the high temperature side, namely to the left side by domain wall energy gradient caused by the temperature gradient. Therefore, as shown in FIG. 6B, when the domain wall reaches position X3 where Relation (5):

$$-Fe+Fg>Fi+Fc \qquad (5)$$

is satisfied, the domain wall in the first magnetic layer is displaced to the left side relatively to the medium. When the domain wall reaches position X4, Relation (5) becomes not satisfied (FIG. 6A) to stop the displacement of the domain wall on the medium. Thereafter, with the movement of the medium, the domain wall is displaced to position X5 as shown in FIG. 6C. At the left side thereof, the displacement of the domain wall is prevented and is brought back to position X5 by the action of the force to drive the domain wall to the right side. Thereby, the domain wall is stopped at this position relatively to the heating region, and displaces continuously to the right side relatively to the medium.

From this state, the behavior of the following domain wall 32 entering the decoupling region is considered below.

Figure 6D:
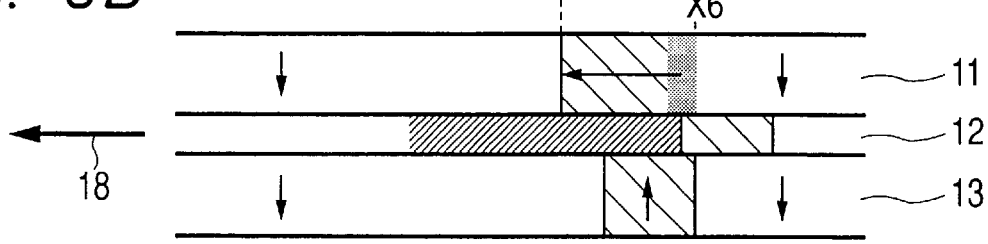

In this state, at the left side region in the first magnetic layer, the magnetic orientation is directed upward, while at the right side thereof the magnetic orientation is directed downward. Force +Fe is applied to the domain wall from the external magnetic field to drive the domain wall to the left side. Further, force +Fg is applied to the domain wall by domain wall energy gradient caused by the temperature gradient to drive the domain wall to the high temperature side, namely to the left side. Therefore, as shown in FIG. 6D, when the following domain wall has reached position X6 where Relation (6) is satisfied:

$$+Fe+Fg>Fi+Fc \qquad (6)$$

the domain wall in the first magnetic layer is displaced to the left side relatively to the medium. The front domain wall is already existing at position X5. Therefore, when the rear domain wall reaches position X5, the both domain walls disappear to allow the magnetic orientation to direct downward in the entire heating region.

On the other hand, since the third magnetic layer has sufficiently high domain wall coercive force, the domain wall in the third magnetic layer keeps the initial state without displacement relative to the medium, and displaces to the left direction relative to the heating region.

Figure 7A:
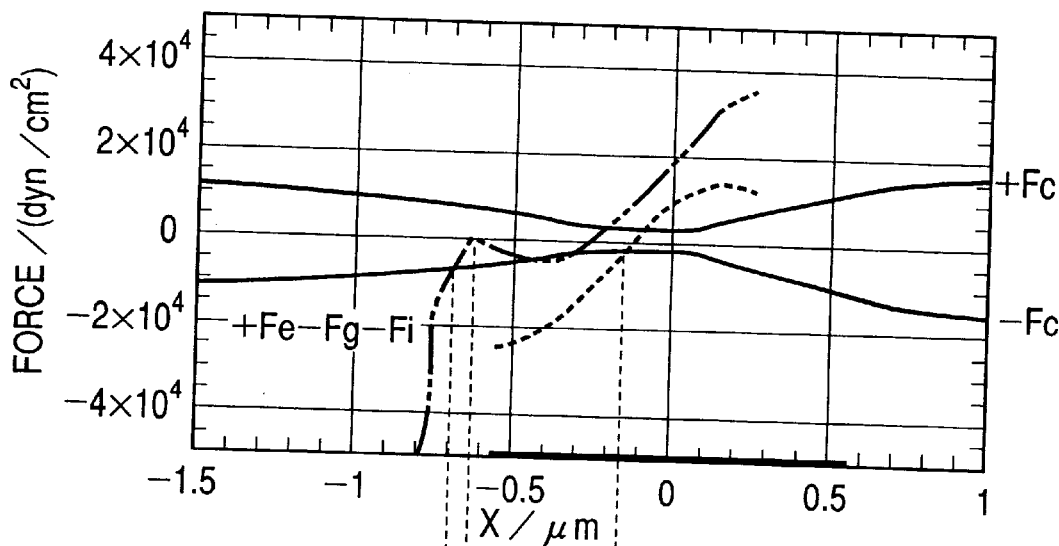
FIGS. 7A, 7B, 7C, and 7D show the displacement of the domain wall from the rear direction of the heated region.

Next, the changes on the rear side of the heated regions are explained. FIG. 7A shows forces act on the domain wall of the first magnetic layer in the rear portion of the heated region.

Figure 7B:
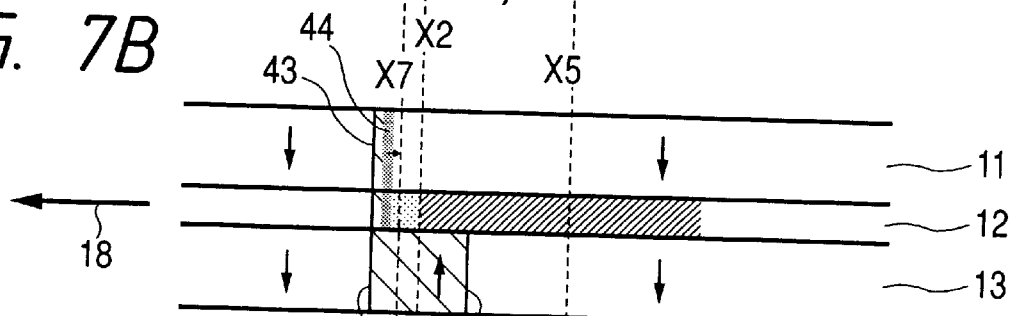

When domain wall 41 (FIG. 7B) of the isolated magnetic domain in the front portion of the third magnetic layer in the medium movement direction reaches position X2 and passes it to the left, the exchange interaction between the first and third magnetic layers recovers again. The spin in the isolated magnetic domain in the third magnetic layer is directed upward. At position X2 and the vicinity thereof, the spin of the first magnetic layer is directed downward, Therefore, when the front domain wall 41 reaches position X2 (FIG. 7B), the spin in the region of the right side of the domain wall 41 becomes antiparallel to form an interfacial domain wall in the first magnetic layer. When the interfacial domain wall has been formed over a certain range, the accumulated interfacial domain wall energy exceeds the energy for the nuclear formation for the domain wall to reverse the magnetization of the first magnetic layer (FIG. 7B).

In the magnetic reversal, a domain wall is formed around the portion of the formed nucleus. Assuming that the domain wall at the lateral side of the recording track can be neglected, the domain wall in the track direction only is considered. Then, domain walls 43, 44 are formed (FIG. 7B) at the front and the rear of the region of the interfacial domain wall in the first magnetic layer. As described below, the displacement of the domain walls to the right and the left reverse instantaneously the magnetization of the first magnetic layer.

The displacement-of domain wall 43 to the left is stopped at the position corresponding to domain wall 41 of the third magnetic layer by disappearance of the interfacial domain wall, and thereafter domain wall 43 is displaced together with the domain wall of the third layer in the left direction relatively to the heating region, as the medium moves. (It may be understood that the left domain wall 43 is formed initially at the position corresponding to domain wall 41 of the third magnetic layer.)

The stopping position of domain wall 44 displaced to the right direction depends on the relation of forces acting on domain wall 44 as described below.

To domain wall 44, force +Fe is applied by the external magnetic field to displace it to the left direction, since the magnetization orientation is directed upward in the region of the left side of domain wall 44 and is directed downward in the region of the right side thereof. Further, to domain wall 44, force −Fg is applied by domain wall energy gradient caused by the temperature gradient to displace domain wall 44. Further, to domain wall 44, force −Fi is applied by exchange interaction with the third magnetic layer to displace domain wall 44 to the right direction to make the interfacial domain wall 45 between the first magnetic layer and the third magnetic layer disappear. Accordingly, the displacement will be stopped at position X7 where Relation (7) below is satisfied as shown in FIG. 7B:

$$+Fe-Fg-Fi>-Fc \qquad (7)$$

(see FIG. 7A). If domain wall 44 displaces to the left side relatively to the heating region, it is brought to position X7 again to hold Relation (7). Thus the domain wall stops relatively to the heating region to displace continuously to the right side relative to the medium.

When domain wall 42 at the rear side relative to the medium delivery direction of the isolated domain wall in the third layer reaches position X2 and passes it to the left side, the exchange interaction becomes effective again.

Figure 7C:
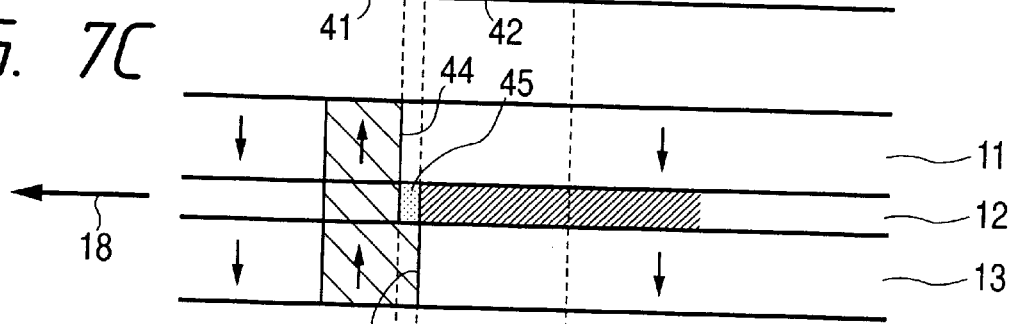

The spin in the region in the left side of domain wall 42 of the third magnetic layer is directed upward. At the time when this domain wall 42 has reached position 42, domain wall 44 exists at position X7 in the first magnetic layer, whereas in the region at the right side of domain wall 44, the magnetic orientation of the first magnetic layer is directed downward. Therefore, the spin is antiparallel in the region between position X2 and position X7 to form an interfacial domain wall (FIG. 7C).

Figure 7D:
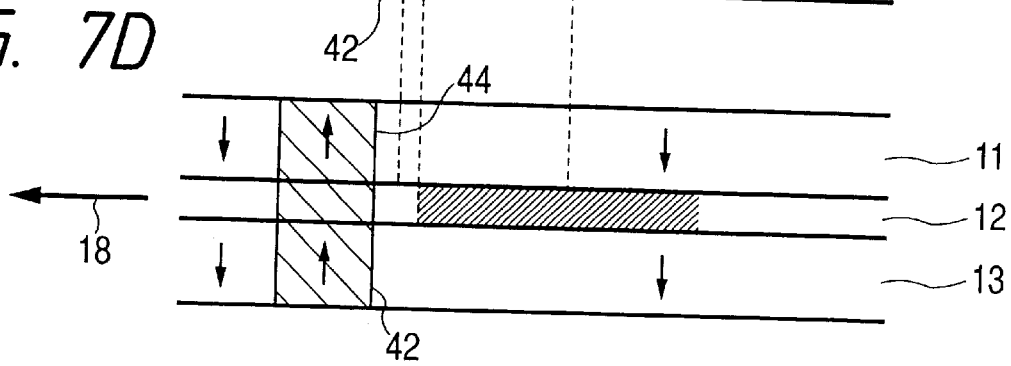

When the domain wall of the third magnetic layer reaches position X7, the interfacial domain wall disappears, and force Fi caused by exchange interaction becomes effective to prevent displacement of domain wall 44 on the medium. Thereafter, Fi is dominant to allow the displacement of domain wall 44 in the first magnetic layer together with domain wall 42 in the third magnetic layer with the movement of the medium to the left side relatively to the heating region (FIG. 7D).

Consequently, the domain walls formed at intervals corresponding to the information reaches successively the area of the light beam spot for information reproduction, and each of the domain walls is displaced to position X5, which can be detected by change of magneto-optical effect of reflection of the light beam. In the light spot, the portion behind position X5 is magnetically oriented downward. Therefore, the domain wall does not displaced from the rear side, and the signals can be reproduced satisfactorily by forming a necessary temperature gradient by the reproducing light beam itself without employing additional means.

In the case where the magnetic orientation at the rear portion in the spot on the first magnetic layer is directed against the external magnetic field in the initial state, the domain wall is displaced from the rear at the first passage of the domain oriented for the external magnetic field. However, the reproduction can be conducted without a problem after the abovementioned first passage.

In FIGS. 6A to 6D, the isothermal line of the temperature for position X3 and position X6 decomposes the record pattern. Therefore, the resolution is improved only by controlling the displacement distance of the magnetic domain wall to correspond to the reproduction spot size irrespectively of the reproduction spot size, so that the resolution is not restricted at all to the optical diffraction limit.

For satisfying Relations (5) to (7), at least Relation (8) should be satisfied:

$$Fg-Fe>Fc \qquad (8)$$

at position X1 (FIG. 5A) where Fi=0 (Fi is a force applied to the first magnetic layer by exchange interaction with the third magnetic layer, and simultaneously Relation (9) should be satisfied:

$$Fg-Fe<Fc \qquad (9)$$

at position X2 (FIG. 5A) where Fi=0.

In other words, the relation below should be satisfied:

$$|d\sigma/dT|\times|G1|-2Ms\times Hr>2Ms\times Hw>|d\sigma/dT|\times|G2|-2Ms\times Hr \qquad (10)$$

where G1 is the temperature gradient at portion X1, G2 is the temperature gradient at portion X2, Hr is the reproducing magnetic field, σ, Ms, and Hw are respectively domain wall energy density, saturation magnetization, and wall coercivity of the first magnetic layer, and T is the medium temperature. Therefor, a temperature distribution should be formed which satisfy the relation:

$$|G1|>|G2| \qquad (11)$$

and reproduction magnetic field should be applied which satisfies the relation:

$$(|G1\times d\sigma/dT|/2Ms)-Hw>Hr>(|G2\times d\sigma/dT|/2Ms)-Hw \qquad (12)$$

The above discussion on the operation can be applied only to a simplified model. Practically, the mode of reversal of magnetization in the first magnetic layer is supposed to be in an intermediate state of a domain wall displacement mode and a simultaneous rotation mode. In the above discussion, the thickness of the domain wall is not taken into consideration. However, transition of the state may occur by expanding the thickness of the domain wall in the first magnetic layer when the coupling with the third magnetic layer is lost.

The direction of the atom spin and the direction of the generated magnetization noticed above may be either parallel or antiparallel, and the direction of the atom spin need not necessarily be perpendicular to the film face.

Examples of the present invention is described below by reference to drawings.

Figure 8:
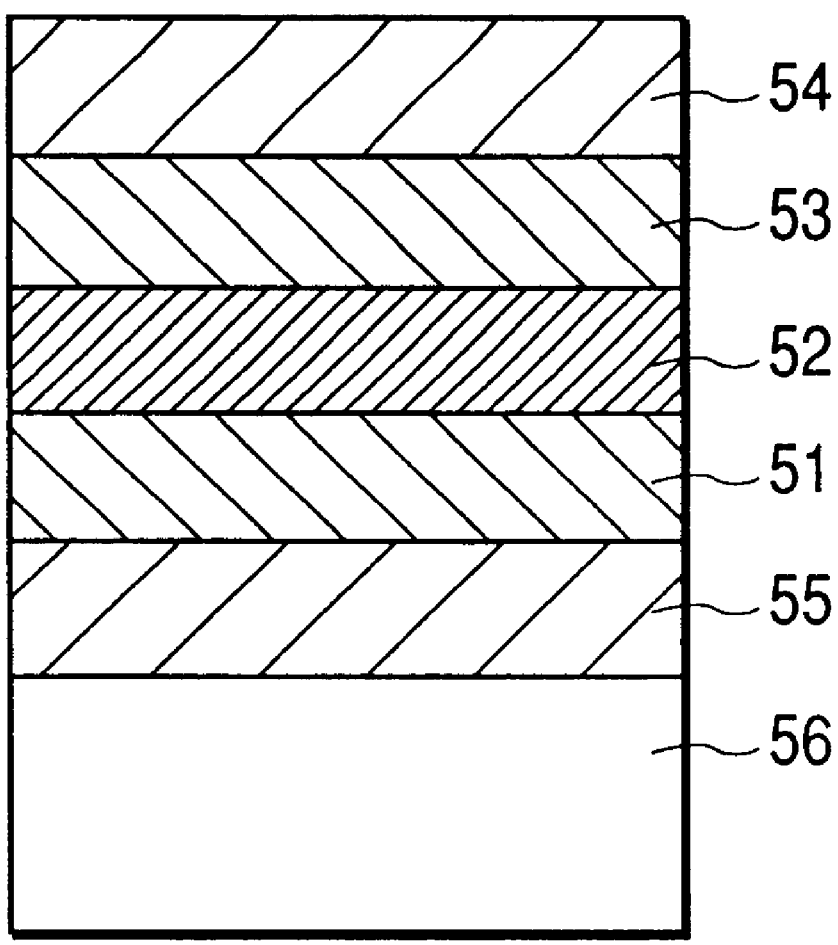
FIG. 8 illustrates a layer constitution of a magneto-optical medium employed in the present invention.

FIG. 8 is a schematic sectional view illustrating an embodiment of the layer constitution of a magnetic recording medium for reproduction of the present invention. In this embodiment, subbing layer 55, first magnetic layer 51, second magnetic layer 52, third magnetic layer 53, surface layer 54 are laminated successively on substrate 56. Substrate 56 may be prepared from a polycarbonate resin, an acrylic resin, glass, or a like material. The material for subbing layer 55 and surface layer 54 includes dielectric materials such as SiN, AlN, SiO, ZnS, MgF, and TaO. When the displacement of the domain wall is detected by a non-optical method, the material need not be light-transmissive. The layers other than the magnetic layers are not essential. The order of lamination of the magnetic layers may be reversed. Additionally a metal layer composed of Al, AlTa, AlTi, AlCr, Cu, Pt, Au or the like may be employed to adjust the thermal properties. A protection layer composed of a synthetic resin may be employed. The substrate after the film formation may be bonded together.

The respective layers may be formed by coating, for example, by continuous sputtering by a maganetron sputtering system, continuous vapor deposition, or a like method. The respective magnetic layer is successively formed without breaking vacuum to cause exchange coupling.

In the above medium, the respective magnetic layers 51 to 53 could be formed from a varieties of material including materials generally used for formation of magnetic recording mediums and magneto-optical recording mediums; and magnetic materials including magnetic bubble materials, and anti-ferromagnetic materials.

For example, the constituting material may be a rare earth-iron group amorphous alloy composed of 10 to 40 atom % of one or more rare earth metal elements such as Pr, Nd, Sm, Eu, Gd, Tb, Dy, Ho, and Er, and 90 to 60 atom % of one or more iron group elements such as Fe, Co, and Ni. Further, a small amount of element such as Cr, Mn, Cu, Ti, Al, Si, Pt, and In may be incorporated into the alloy for improvement of corrosion resistance.

The constituting material includes also platinum group-iron group periodical structure films such as Pt/Co, and Pd/Co; platinum group-iron group alloy films; anti-ferromagnetic materials such as Co—Ni—O type alloys, and Fe—Rh type alloys; and magnetic garnet.

The saturation magnetization of heavy rare earth-iron group amorphous alloys can be controlled by adjusting the composition ratio of the rare earth element to the iron group element. By a compensation composition, the saturation magnetization can be controlled to 0 emu/cc.

The Curie temperature also can be controlled by the composition ratio. For controlling it independently of the saturation magnetization, a part of Fe as the iron group element is preferably replaced by Co. Specifically, substitution of one atom % of Fe by Co elevates the Curie temperature by about 6° C. Therefore, the Curie temperature can be controlled by adjusting the amount of Co to be added. The Curie temperature can be lowered by adding a very small amount of non-magnetic element such as Cr, Ti, and Al. The Curie temperature can also be controlled by using two or more kinds of rare earth elements and adjusting the ratio thereof.

The coercive force of the domain wall and the energy density of the domain wall are controlled mainly by selecting the material-constituting elements, but can be controlled also by the state of the subbing layer and film-forming conditions such as a sputtering gas pressure. The Tb type and Dy type materials have a high coercive force of domain walls and a high energy density of domain walls, while the Gd type of materials have a low coercive force and a low energy density thereof. They can be controlled also by addition of an impurity.

The film thickness can be controlled by a film formation velocity and a film formation time.

Data signals are recorded onto the magneto-optical medium by changing the magnetic orientation state of the third magnetic layer so as to correspond to the data signals by magnetic recording or thermomagnetic recording. In one type of the thermomagnetic recording system, the external magnetic field is modulated while a laser light beam is projected to raise the temperature of the third magnetic layer up to the Curie temperature or higher. In another type of the thermomagnetic recording system, the laser power is modulated while a magnetic field is applied in a fixed direction. In the latter type system, recording magnetic domain of smaller than the light spot diameter can be formed by adjusting the laser light intensity such that only a limited region in the light spot is heated to the Curie temperature or higher.

The present invention is described below in more detail by reference to examples without limiting the invention.

EXAMPLE 1

In a DC magnetron sputtering apparatus, were set targets composed of B-doped Si, Gd, Tb, Fe, Co, and Cr respectively, and a polycarbonate substrate having guide grooves for tracking was set on a substrate holder. The chamber was evacuated to $1 \times 10^{-5}$ Pa or higher vacuum by a cryopump. To the evacuated chamber, gaseous argon is introduced to a pressure of 0.5 Pa. Then the targets were sputtered onto the rotating substrate to form the respective layers.

Firstly, an SiN layer was formed in a thickness of 80 nm as the subbing layer. Thereon, a GdFeCr layer as the first magnetic layer in a film thickness (h1) of 30 nm, a TbFeCr layer as the second magnetic layer in a film thickness (h2) of 10 nm, and a TbFeCoCr layer as the third magnetic layer in a film thickness (h3) of 80 nm were formed successively. Finally, an SiN layer as the protection layer was formed in a thickness of 60 nm. In formation of the SiN layer, $N_2$ gas was introduced to the chamber in addition to the argon gas, and the film formation was conducted by reactive sputtering.

The composition ratio of the respective magnetic layers was controlled by the ratio of the powers applied to the respective targets of Gd, Tb, Fe, Co, and Cr. The composition ratios of the respective magnetic layers were adjusted to be approximate to the compensation composition.

The Curie temperature of the first magnetic layer (Tc1) was adjusted to 220° C., that of the second magnetic layer (Tc2) to 160° C., and that of the third magnetic layer (Tc3) to 290° C.

The recording and reproduction was conducted with a magneto-optical disk evaluation apparatus employing conventional magnetic head for magnetic field-modulating recording by rotation of the medium at a linear velocity of 1.5 m/sec.

In recording, a pattern of upward magnetized regions and downward magnetized regions was formed by magnetic modulation of ±200 Oe by DC irradiation of laser beam with a power of 4 mW.

Figure 9A:
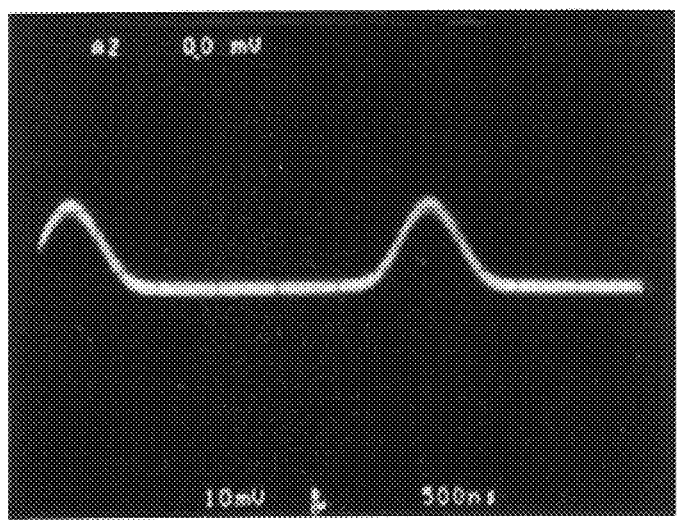
FIGS. 9A, 9B, 10, 11A, and 11B show reproduced signal wave forms observed by oscilloscope.
Figure 9B:
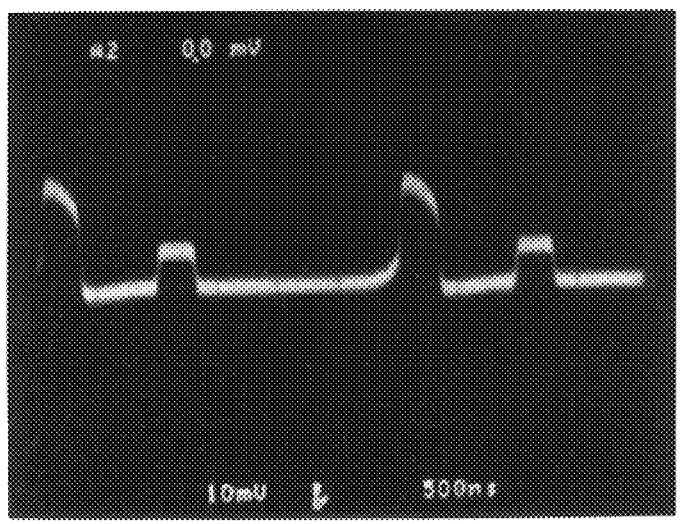

Firstly, marks of 0.45 $\mu$m were recorded at a cycle of 4.5 $\mu$m. The recording marks were reproduced with a reproducing laser power Pr of 0.8 mW or 1.5 mW. FIGS. 9A and 9B show the signal waveforms observed by oscilloscope.

In the case where heating is conducted by the reproducing laser itself, a peak of temperature distribution is formed usually inside the irradiation spot on the medium face, and isothermal line of a temperature Ts are formed at the front portion and the rear portion of the irradiation spot. Consequently, displacement of the magnetic domain walls from the front Ts isothermal line and that of the rear Ts isothermal line to the temperature peak position are combinedly detected at the reproduction spot, resulting in high noise of the reproduced signals.

With the movement of heating-reproducing spot relatively to the medium, heat is accumulated more in the rear portion of the heating-reproducing spot than in the front portion thereof, so that the peak of the temperature distribution is deviated rearward from the center of the spot.

At the reproduction power of 0.8 mW, the temperature within the spot was lower than the temperature Ts for initiation of the domain wall displacement, and the reproduction was conducted in a conventional manner as shown in FIG. 9A, isolated marks of a 4.5 μm cycle were reproduced in a usual reproduction waveform since they are reproducible by a conventional reproduction method.

At the higher reproduction power of 1.5 mW, a region at the temperature of Ts or higher was formed, and as shown in FIG. 9B, waves with a rectangular waveform were observed which are caused by domain wall displacement. Two rectangular waves having different amplitudes were observed simultaneously with a certain delay time. The wave with a larger amplitude is the signal wave caused by domain wall displacement from the isothermal line of Ts at the front portion of the moving reproduction, and the wave with a smaller amplitude is the signal wave caused by domain wall displacement from the isothermal line of Ts at the rear portion of the moving reproduction. Since the temperature peak as the destination of the domain wall displacement is deviated rearward from the center, the signal wave by domain wall displacement from the rear Ts isothermal line has a smaller amplitude. The rise of the signal wave is a change of the signal level caused by the domain wall displacement at the front portion of the recorded mark, and the fall of the signal wave is a change of the signal level caused by the domain wall displacement at the rear portion of the recorded mark.

Figure 10:
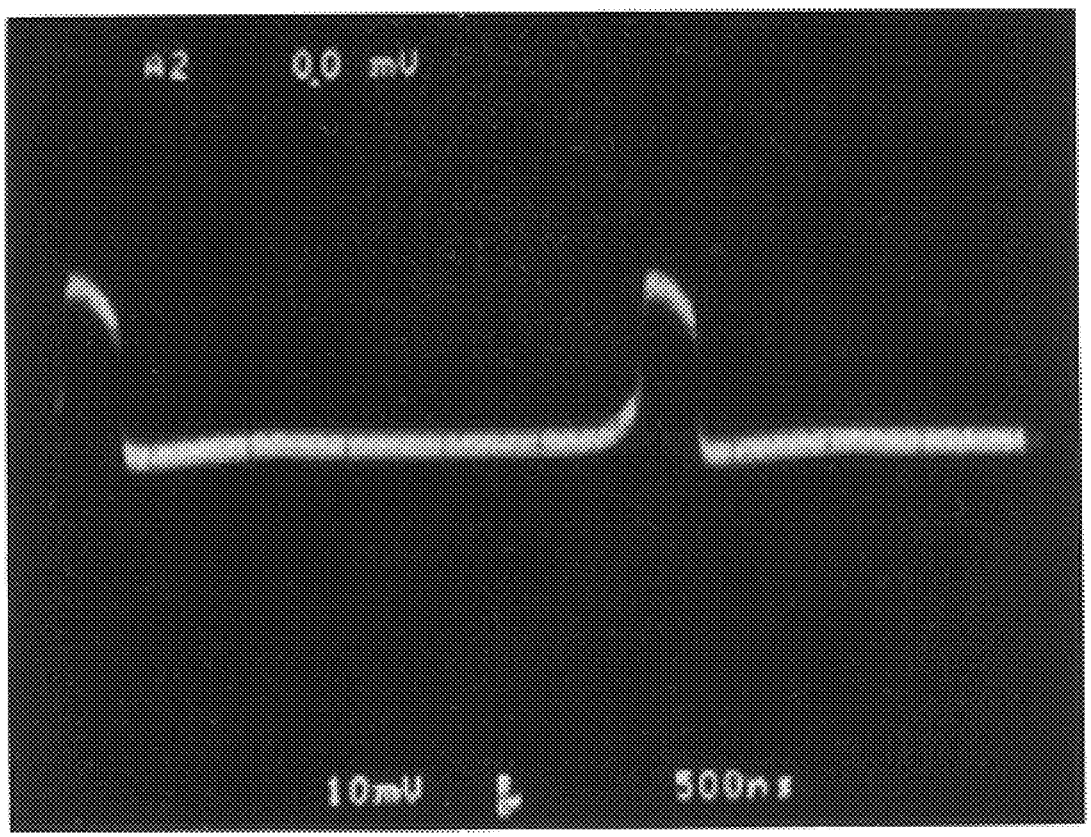

With the reproduction power kept unchanged at 1.5 mW, a reproducing magnetic field of 200 Oe was applied in a direction perpendicular to the film face. Thereby, the rectangular waves of the smaller amplitude disappeared completely, and the domain wall displacement from the front Ts isothermal line only was detected as shown in FIG. 10. In other words, the application of the reproducing magnetic field prevents the domain wall displacement from the isothermal line of the temperature Ts in the rear portion of the laser spot, and allows only the domain wall displacement from the Ts isothermal line in the front portion.

The intensity of the reproducing magnetic field was changed from 500 to 0 Oe in downward direction perpendicular to the film face, and from 0 to 500 Oe in upward direction perpendicular thereto. Consequently, satisfactory reproduction signals could be obtained in the range of from 180 to 350 Oe both in the upward direction and in the downward direction. At the intensity lower than 180 Oe, the domain wall displacement from the rear could not be completely prevented, whereas at the intensity higher than 350 Oe, the domain wall displacement from the front was not stably induced.

Figure 11A:
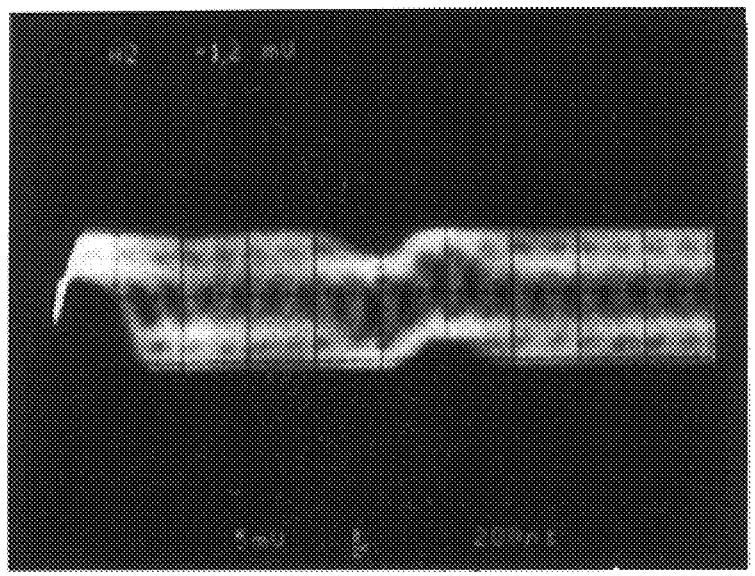
Figure 11B:
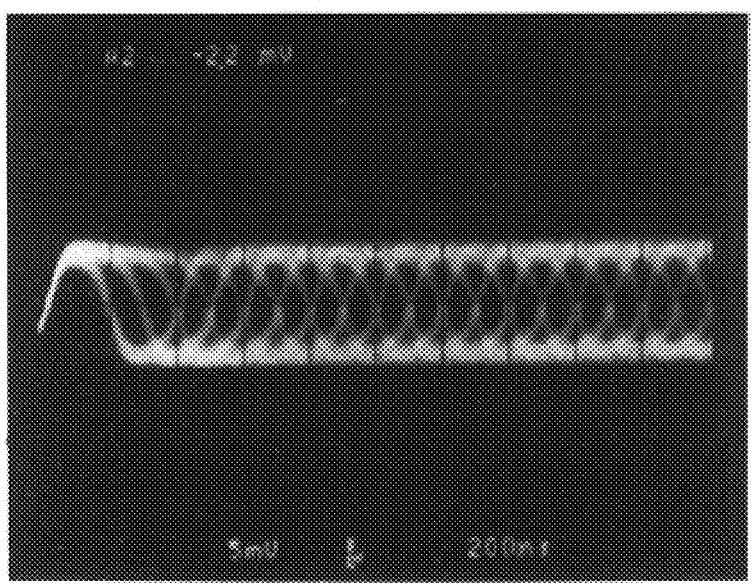

Next, random signals of a length of 0.3 μm or more of 1–7 modulation were recorded in the same manner as above, and were reproduced with a reproduction power of 1.5 mW. FIGS. 11A and 11B show the eye patterns, FIG. 11A showing the eye pattern without application of the reproducing magnetic field, and FIG. 11B showing the eye pattern formed by application of the reproducing magnetic field of 200 Oe in a direction perpendicular to the film face. The jitter was measured in reproduction by application of reproducing magnetic field, and found to be about 10% of the window width satisfactorily.

As shown above, excellent reproduction signals could be obtained by application of a suitable intensity of reproducing magnetic field, even when the one and the same laser beam was used both for reproduction and for heating.

EXAMPLE 2

Recording was conducted similarly with the same medium as in Example 1. The reproduction was conducted to find a suitable magnetic field intensity for the reproduction at the linear speed to 3 m/sec, or 6 m/sec by changing rotation speed of the medium. Consequently, signals were reproduced satisfactorily in the range from 160 to 380 Oe, and from 130 to 440 Oe respectively.

According to simulation of temperature distribution, the higher the linear velocity, the steeper will the temperature gradient be at the front portion, and the more slight will the temperature gradient be at the rear portion.

These results satisfies the relation:

$$|G1|>|G2|$$

where G1 is the temperature gradient in the front portion, and G2 is the temperature gradient in the rear portion, and at least in the second magnetic layer at the Curie temperature, the relation below are satisfied:

$$(|G1 \times d\sigma/dT|/2Ms)-Hw>Hr>(|G2 \times d\sigma/dT|/2Ms)-Hw$$

where Hr is the reproducing magnetic field, G1 and G2 are as mentioned above, σ, Ms, and Hw are respectively domain wall energy density, saturation magnetization, and coercive force of the domain wall of the first magnetic field, and T is the medium temperature.

Typical experimental data are as below:

Curie Temperature: 160° C.

dσ/dT: $-7.0 \times 10^{-3}$ erg/cm$^2$.° C.

Ms: 20 emu/cm$^3$

Hw: 20 Oe

G1: $-2.32 \times 10^{6°}$ C./cm (at linear velocity 3 m/sec)

G2: $1.02 \times 10^{5°}$ C./cm (at linear velocity 3 m/sec)

G1: $-2.66 \times 10^{6°}$ C./cm (at linear velocity 6 m/sec)

G2: $0.85 \times 10^{6°}$ C./cm (at linear velocity 6 m/sec)

EXAMPLE 3

With the same medium as that in Example 1, random signals of a mark length of 0.3 μm or less of 1–7 modulation were recorded in the same manner as in Example 1, and were reproduced with a reproduction power of 1.5 mW by application of reproducing magnetic field having a component perpendicular to the film face as in Example 1 and additionally a component in the direction of the film face. The jitter found to be improved and to be about 10% of the window width satisfactorily.

The reproducing method of the present invention is not limited to the ones utilizing the change of polarization direction by magneto-optical effect, but may be the ones by detecting the another change causes by domain wall displacement. The recording film of the magneto-optical medium need not be a perpendicularly magnetized film, provided that it is a magnetic material. The interface of each of the magnetic layer need not be distinct, but may be of a constitution in which the properties change gradually in the thickness direction.

What is claimed is:

1. A signal reproducing method for reproducing by domain wall displacement information recorded on a recording medium, said method comprising the steps of:

projecting a light spot onto a recording medium to cause a temperature distribution thereon;

moving the light spot and the recording medium relative to one another;

applying a reproducing magnetic field to a light spot area on the recording medium sufficient to substantially prevent displacement of a domain wall from a region at a rear portion of the light spot area, in a moving direction of the light spot, to an interior region of the light spot area; and detecting domain wall displacement at a region inside a front portion of the light spot area to reproduce information recorded on the recording medium.

2. The signal reproducing method according to claim 1, wherein a temperature gradient of the temperature distribution satisfies the relation:

$$|G1|>|G2|$$

where G1 is the temperature gradient in a front portion of the light spot in the moving direction of the light spot, and G2 is the temperature gradient in the rear portion of the light spot in the moving direction of the light spot.

3. The signal reproducing method according to claim 2, wherein the recording medium comprises:

a first magnetic layer enabling displacement of the domain wall;

a third magnetic layer for storing information; and a second magnetic layer provided between the first magnetic layer and the third magnetic layer, and having a Curie temperature lower than the Curie temperature of each of the first magnetic layer and the third magnetic layer.

4. The signal reproducing method according to claim 3, wherein the reproducing magnetic field satisfies the following relation at the Curie temperature of the second magnetic layer:

$$(|G1 \times d\sigma/dT|/2Ms)-Hw>Hr>(|G2 \times d\sigma/dT|/2Ms)-Hw$$

where Hr is the reproducing magnetic field, G1 is the temperature gradient in the front portion of the light spot in the moving direction of the light spot, G2 is the temperature gradient in the rear portion of the light spot in the moving direction of the light spot, $\sigma$, Ms, and Hw are, respectively, domain wall energy density, saturation magnetization, and wall coercivity of the first magnetic field, and T is the medium temperature.

5. The signal reproducing method according to claim 1, wherein a main component of the reproducing magnetic field is a magnetic field component perpendicular to the face of the recording medium.

6. The signal reproducing method according to claim 5, wherein a minor component of the reproducing magnetic field is a magnetic field component parallel to the face of the recording medium.

7. A signal reproducing apparatus for reproducing by domain wall displacement information recorded on a recording medium, said apparatus comprising:

means for projecting a light spot onto the recording medium, thereby generating a temperature distribution in a light spot area of the recording medium;

means for moving the light spot relative to the recording medium, thereby defining a front portion and a rear portion of the light spot area in a direction of movement of the light spot;

means for applying a reproducing magnetic field to the light spot area on the recording medium sufficient to substantially prevent displacement of a domain wall from a region at the rear portion of the light spot area to an interior region of the light spot area; and means for detecting domain wall displacement at a region inside a front portion of the light spot area, thereby reproducing information recorded on the recording medium.

\* \* \* \* \*

UNITED STATES PATENT AND TRADEMARK OFFICE
CERTIFICATE OF CORRECTION

PATENT NO. : 6,345,016 B1
DATED : February 5, 2002
INVENTOR(S) : Tsutomu Shiratori It is certified that error appears in the above-identified patent and that said Letters Patent is hereby corrected as shown below:

<u>Column 1,</u>
Line 63, "than optical" should read -- than the optical --.

<u>Column 3,</u>
Line 52, "layer," should read -- layer 78, --.
Line 53, "layer, and a displacement layer," should read -- layer 77, and a displacement layer 76. --.

<u>Column 6,</u>
Line 2, "beam" should read -- beam 16 --.
Line 22, "a" should read -- σ --.
Line 53, "disappear" should read -- to disappear --.

<u>Column 7,</u>
Line 7, "is disappeared." should read -- disappears. --.
Line 17, "at the" should read -- at --.

<u>Column 8,</u>
Line 24, "the both" should read -- both --.
Line 43, "downward," should read -- downward. --.
Line 62, "displacement-of" should read -- displacement of --.

<u>Column 9,</u>
Line 57, "displaced" should read -- displace --.

<u>Column 10,</u>
Line 28, "Therefor," should read -- Therefore, --.

<u>Column 11,</u>
Line 13, "varieties" should read -- variety --.

UNITED STATES PATENT AND TRADEMARK OFFICE
CERTIFICATE OF CORRECTION

PATENT NO. : 6,345,016 B1
DATED : February 5, 2002
INVENTOR(S) : Tsutomu Shiratori It is certified that error appears in the above-identified patent and that said Letters Patent is hereby corrected as shown below:

<u>Column 14,</u>
Line 30, "$d\sigma/dT{:}{-}7.0\text{x}10^{-3}$ erg/cm$^2$. ºC" should read -- $d\sigma/dT{:}{-}7.0\text{x}10^{-3}$ erg/cm$^2 \cdot$ºC --.
Line 31, "Ms:20 emu/cm$^3$" should read -- ¶ Ms:20 emu/cm$^3$ --.
Line 35, "$1.02\text{x}10^{5}$ºC./cm" should read -- $1.02\text{x}10^{6}$ºC/cm --.
Line 52, "the another change causes" should read -- another change caused --.
Line 56, "layer" should read -- layers --.

Signed and Sealed this

Ninth Day of July, 2002

Attest:

JAMES E. ROGAN
Attesting Officer    Director of the United States Patent and Trademark Office